United States Patent [19]

Kassai

[11] Patent Number: 4,714,292
[45] Date of Patent: Dec. 22, 1987

[54] BABY CARRIAGE

[75] Inventor: Kenzou Kassai, Osaka, Japan

[73] Assignee: Aprica Kassai Kabushikikaisha, Osaka, Japan

[21] Appl. No.: 942,064

[22] Filed: Dec. 17, 1986

Related U.S. Application Data

[63] Continuation of Ser. No. 751,039, Jul. 1, 1985, abandoned.

[30] Foreign Application Priority Data

| Jul. 4, 1984 | [JP] | Japan | 59-101863[U] |
| Sep. 10, 1984 | [JP] | Japan | 59-13744[U] |
| Mar. 18, 1985 | [JP] | Japan | 60-54805[U] |

[51] Int. Cl.$^4$ ............................................. A47C 7/50
[52] U.S. Cl. ........................... 297/437; 248/412; 280/47.4; 297/283; 297/423
[58] Field of Search ............ 297/283, 423, 40, 430, 297/437; 108/148; 248/411, 412, 414; 280/47.4

[56] References Cited

U.S. PATENT DOCUMENTS

| 335,594 | 2/1886 | Kochs | 297/437 |
| 508,690 | 11/1893 | Fauber | 297/437 X |
| 912,781 | 2/1909 | Barrett et al. | 297/283 |
| 1,221,306 | 4/1917 | Call | 248/411 X |
| 1,630,870 | 5/1927 | Strunck | 248/412 |
| 1,887,323 | 11/1932 | Perron | 297/437 |
| 2,236,983 | 4/1941 | Yusek | 297/283 X |
| 2,410,797 | 11/1946 | Allenbaugh | 280/47.4 X |
| 3,692,356 | 9/1972 | Merters | 297/410 X |
| 3,780,974 | 12/1973 | Takahashi | 248/411 |
| 3,947,140 | 3/1976 | Thomas | 248/423 X |
| 4,229,039 | 10/1980 | Day | 297/437 X |
| 4,483,565 | 11/1984 | Terui et al. | 297/410 |

FOREIGN PATENT DOCUMENTS

| 67330 | 10/1975 | Australia | 248/411 |
| 372439 | 11/1963 | Switzerland | 297/437 |

OTHER PUBLICATIONS

Ritter Dental Manufacturing Co. brochure dated Nov. 14, 1939; "Ritter Junior Chair".

Primary Examiner—James T. McCall
Assistant Examiner—Peter R. Brown
Attorney, Agent, or Firm—W. G. Fasse; D. H. Kane, Jr.

[57] ABSTRACT

A BABY CARRIAGE (1) has a footrest (9) which extends between and is attached to a pair of front legs (5) by whose level can be adjusted sleeves slidable up or down along the front legs, whereby the position of the footrest can be adjusted to a desired level. The footrest has first and second foot support surfaces which can be brought selectively into a foot supporting position for using one or the other surface as the support.

9 Claims, 34 Drawing Figures

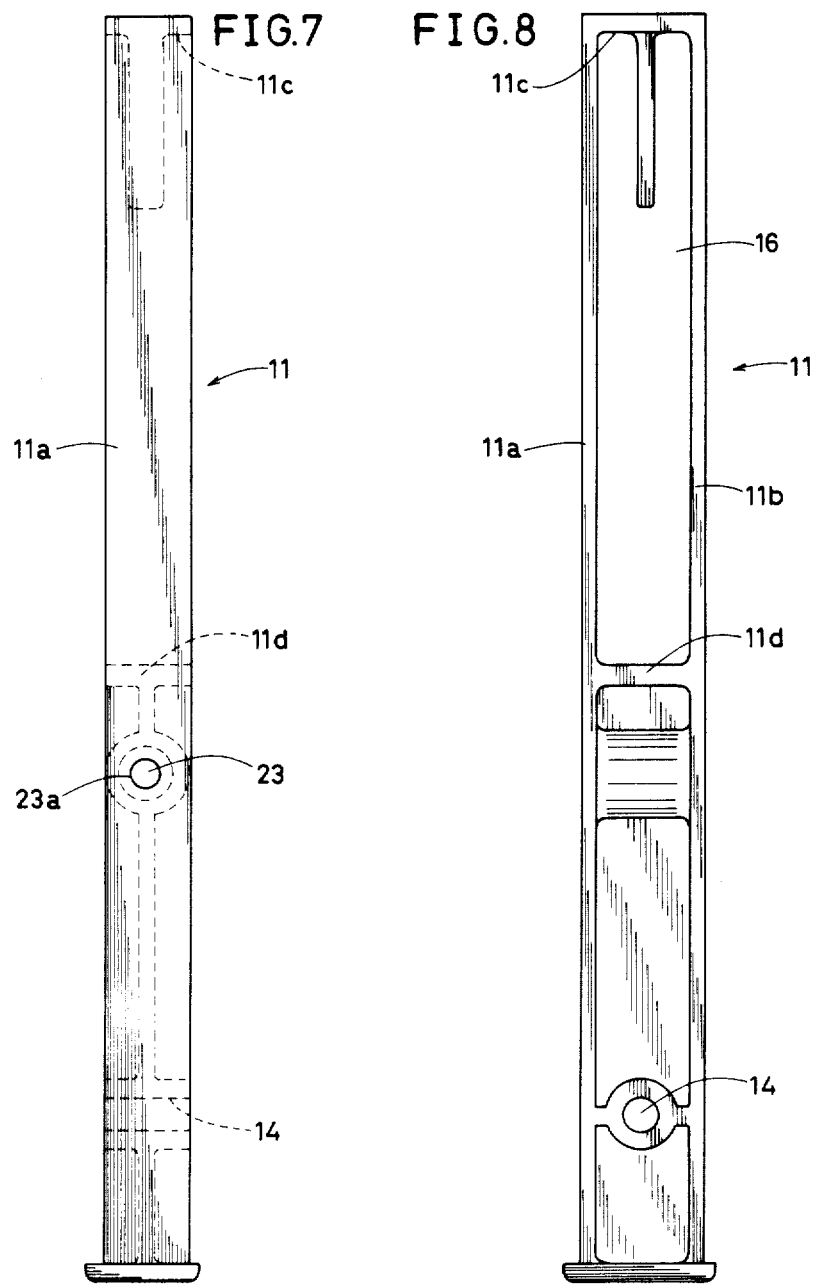

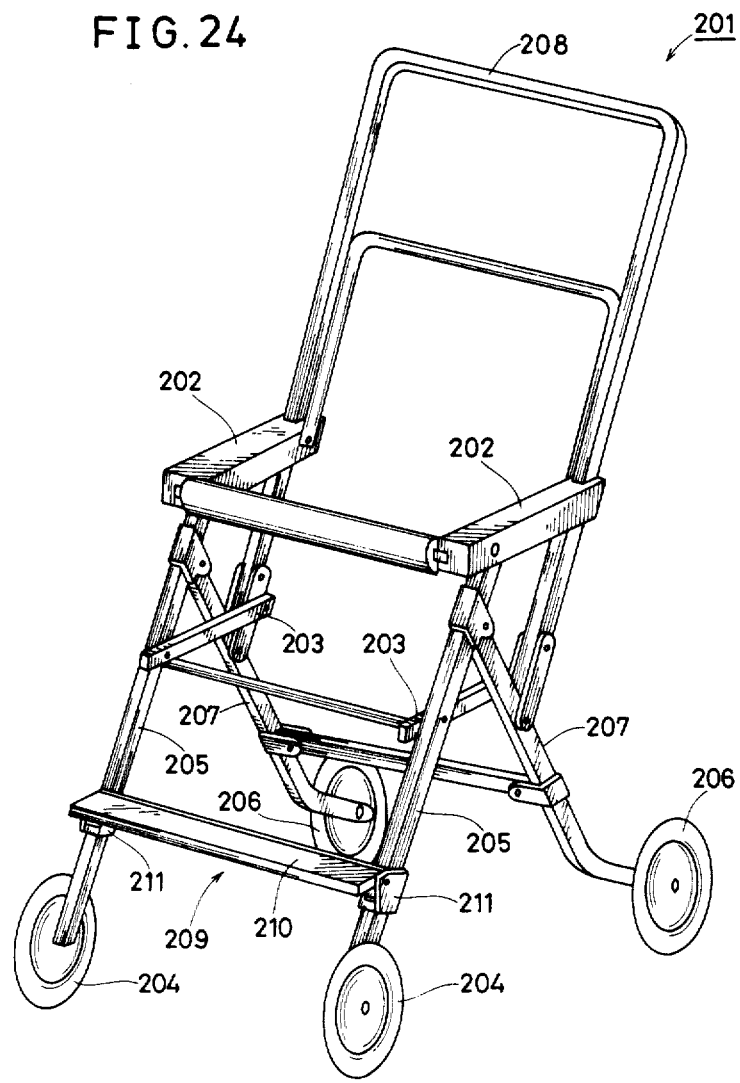

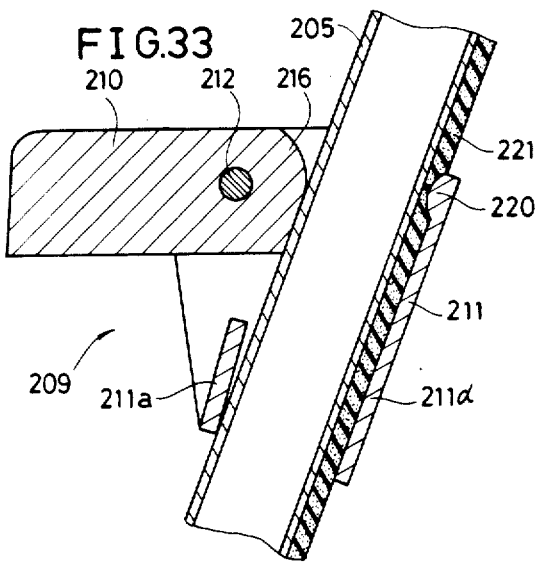
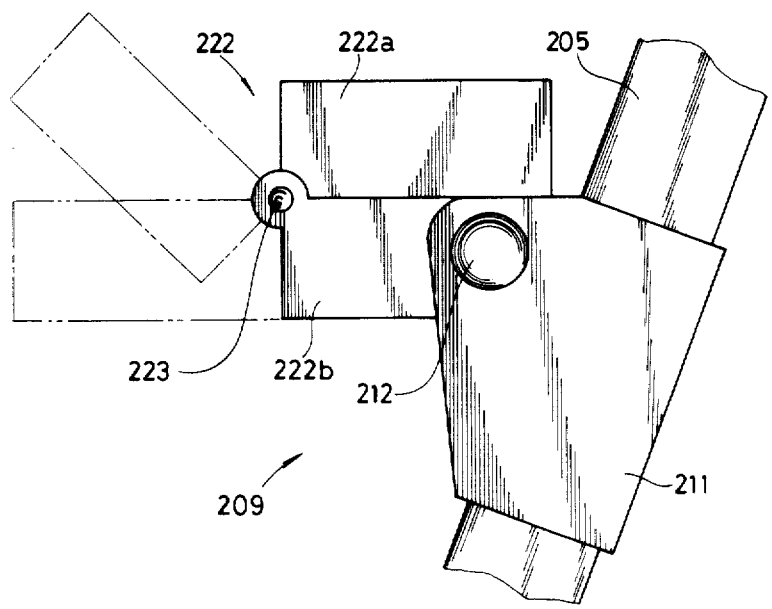

BABY CARRIAGE

This application is a continuation of Application Ser. No. 751,039, filed July 1, 1985, now abandoned.

BACKGROUND OF THE INVENTION

Field of the Invention

This invention relates to a baby carriage and more particularly it relates to a baby carriage having a footrest extending between and attached to a pair of front legs having front wheels.

Description of the Prior Art

Generally, said footrest is fixedly attached to the front legs. Furthermore, the level of the footrest is usually set to correspond to infants that are about two years old. However, infants or babies to be seated in baby carriages range over a wide age span. For example, baby carriages are designed to be used for infants from 2-3 months to 3 years of age. Further, even if infants are of the same age, there is a variation in their physical size. As a result, when a baby or infant with a small body is set on the seat, its feet do not reach the footrest, thus presenting the so-called dangling state. Conversely, for an infant with a big body, the distance from the seat to the footrest would be too short, so that the infant's knees have to be bent to a great extent if the infant's feet are to be placed on the footrest. As a result, the infant feels cramped.

SUMMARY OF THE INVENTION

This invention is a baby carriage which, in order to eliminate the aforesaid inconveniences, is designed so that the level of its footrest can be adjusted as required.

Thus, when a baby or infant with a small body is to be set on the seat, the level of the footrest can be raised, while when an infant with a big body is to be set on the seat, the level of the footrest can be lowered. In this way, a comfortable environment can be provided for any baby or infant to be seated in the baby carriage.

These object and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a front view of an insert member shown in FIG. 2;

FIG. 8 is a side view of the insert member;

FIG. 24 is a perspective view of another embodiment of the invention;

FIG. 33 is a side sectional view of a further embodiment of the invention; and

FIG. 34 is a side view of another embodiment of the invention.

DESCRIPTION OF THE PREFERRED EMBODIMENTS AND OF THE BEST MODE OF THE INVENTION

Various arrangements for installing a footrest so that its level can be adjusted may be contemplated. An embodiment shown in FIGS. 1 to 11 is an example of such an arrangement.

Figure 1:
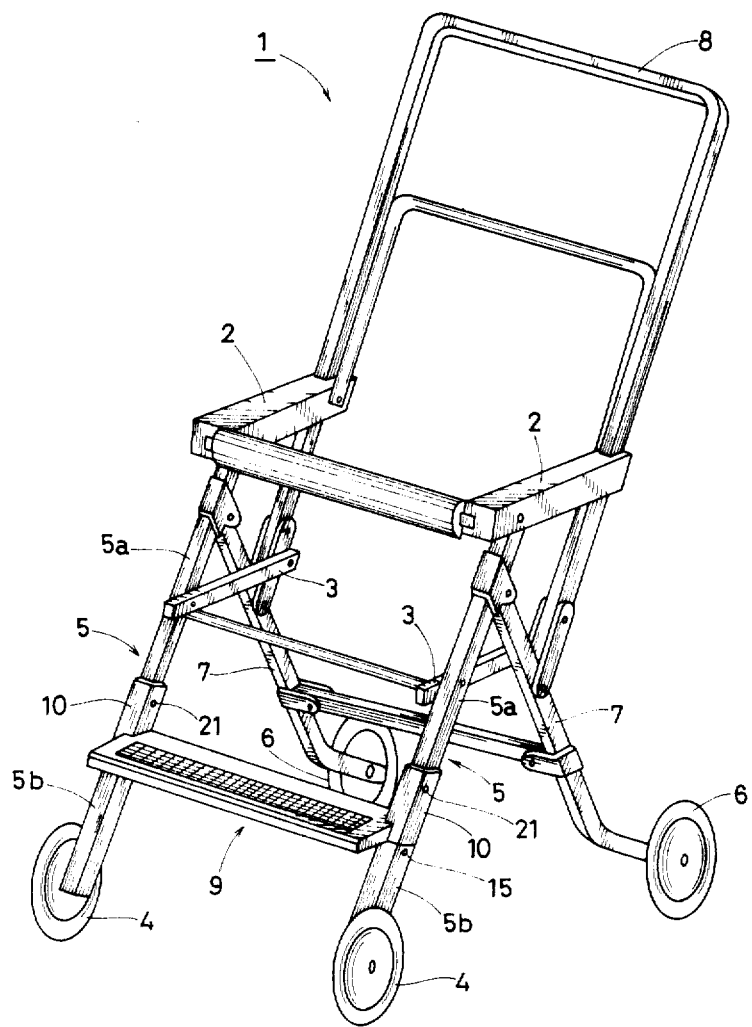
FIG. 1 is a perspective view showing an embodiment of this invention.

Referring to FIG. 1, a baby carriage 1 comprises a pair of longitudinally extending handrails 2, seat support rods 3 for supporting a seat, a pair of front legs 5 attached at their upper ends to the handrails 2 and having at their lower ends front wheels 4, a pair of rear legs 7 attached at their upper ends to the front legs 5 and having at their lower ends rear wheels 6, and a U- shaped push rod 8. A footrest 9 extends between and is attached to the front legs 5.

The footrest 9 has a pair of sleeves 10 on its opposite lateral sides to cooperate with the front legs 5. A mechanism for adjusting the level of the footrest 9 is provided in association with said sleeves 10 and said front legs 5. Such footrest level adjusting mechanisms are provided on both the right and left sides, but since they are substantially the same, only the footrest level adjusting mechanism provided on the left side will be described.

Figure 2:
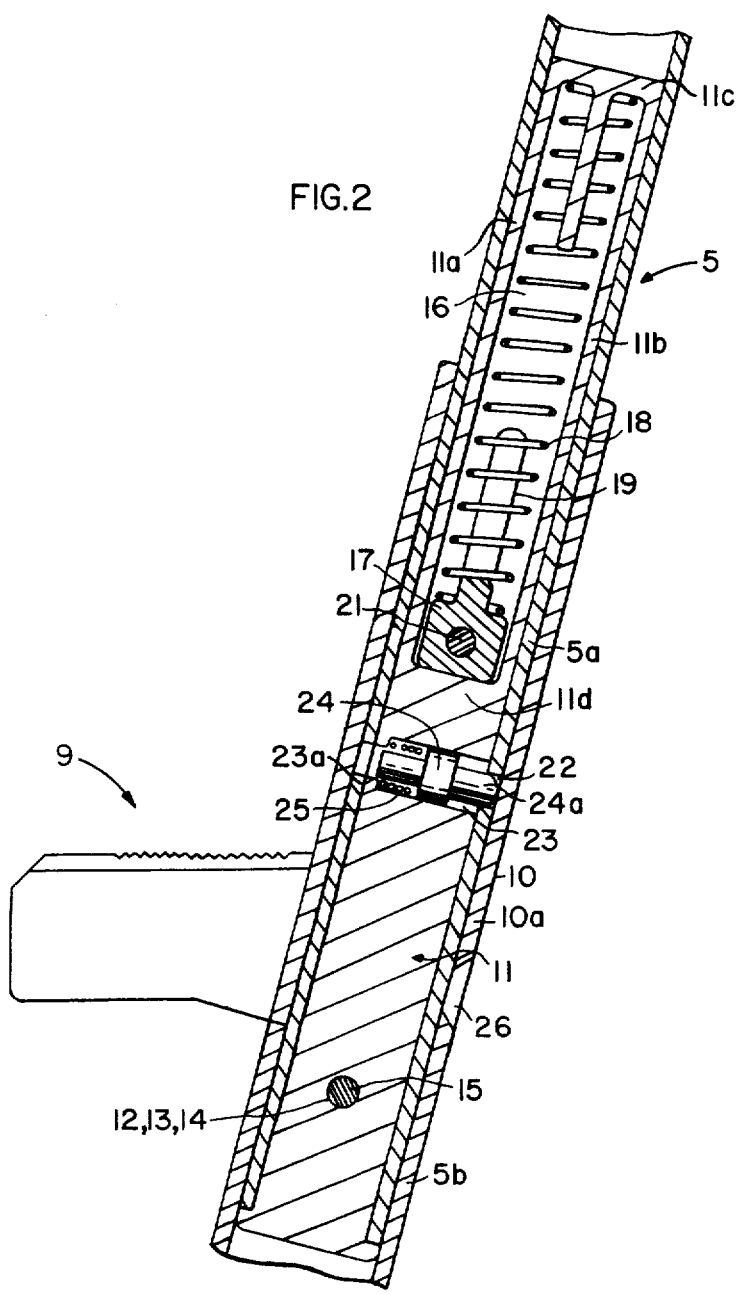
FIG. 2 is an enlarged central sectional view of a portion where a sleeve for a footrest overlaps a front leg shown in FIG. 1.

FIG. 2 is an enlarged central sectional view of a portion where the sleeve 10 of the footrest 9 overlaps the front leg 5 shown in FIG. 1. Referring to FIG. 2 as well as FIG. 1, the front leg 5 comprises an upper front leg 5a positioned in the upper region and a lower front leg 5b positioned in the lower region. The upper and lower front legs 5a and 5b are each in the form of a sleeve. The size of the upper front leg 5a is such that it can be received in the lower front leg 5b. As shown in FIG. 2, the lower end portion of the upper front leg 5a fits into the upper end portion of the lower front leg 5b. Further, the upper front leg 5a has an insert member 11 inserted therein from below.

Figure 3:
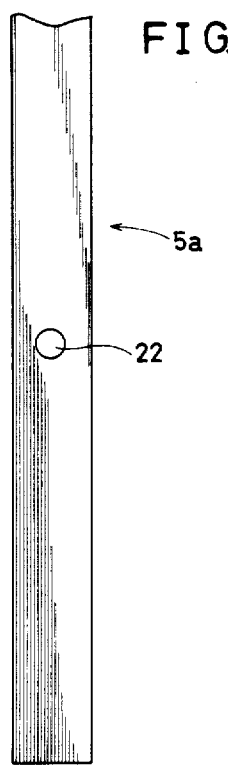
FIG. 3 is a front view of an upper front leg shown in FIG. 2.
Figure 4:
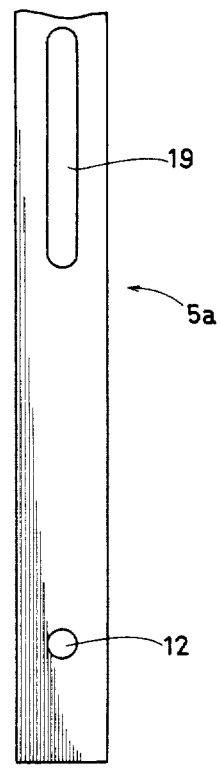
FIG. 4 is a side view of the upper front leg.
Figure 5:
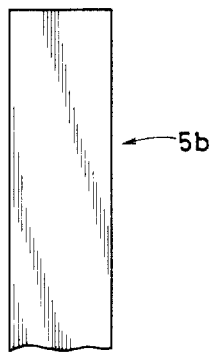
FIG. 5 is a front view of a lower front leg shown in FIG. 2.
Figure 6:
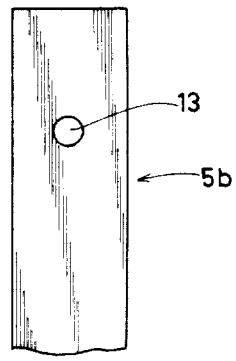
FIG. 6 is a side view of the lower front leg.

FIGS. 3 and 4 are front and side views, respectively, of the upper front leg 5a; FIGS. 5 and 6 are front and side views, respectively, of the lower front leg 5b; and FIGS. 7 and 8 are front and side views, respectively, of the insert member 11.

Referring to FIGS. 4, 6 and 8, the lower end portion of the upper front leg 5a, the upper end portion of the lower front leg 5b, and the lower end portion of the insert member 11 are formed with throughgoing holes 12, 13 and 14, respectively. These throughgoing holes 12, 13 and 14 are brought into alignment with each other. And, as shown in FIG. 2, a pin 15 is inserted into the aligned throughgoing holes 12, 13 and 14, whereby the upper and lower front legs 5a and 5b and the insert member 11 are fixed together.

Figure 9:
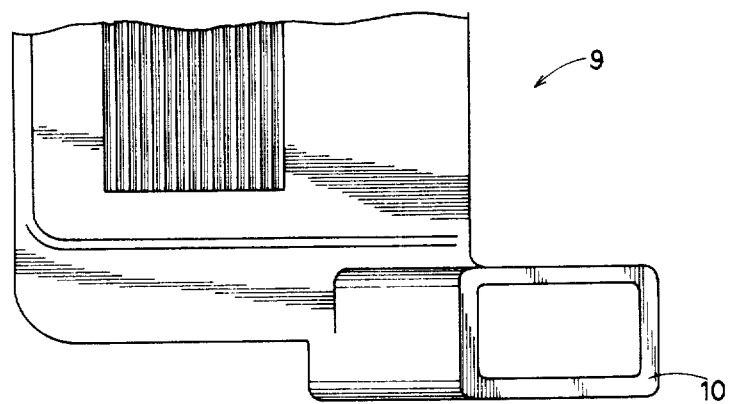
FIG. 9 is a plan view of the footrest.
Figure 10:
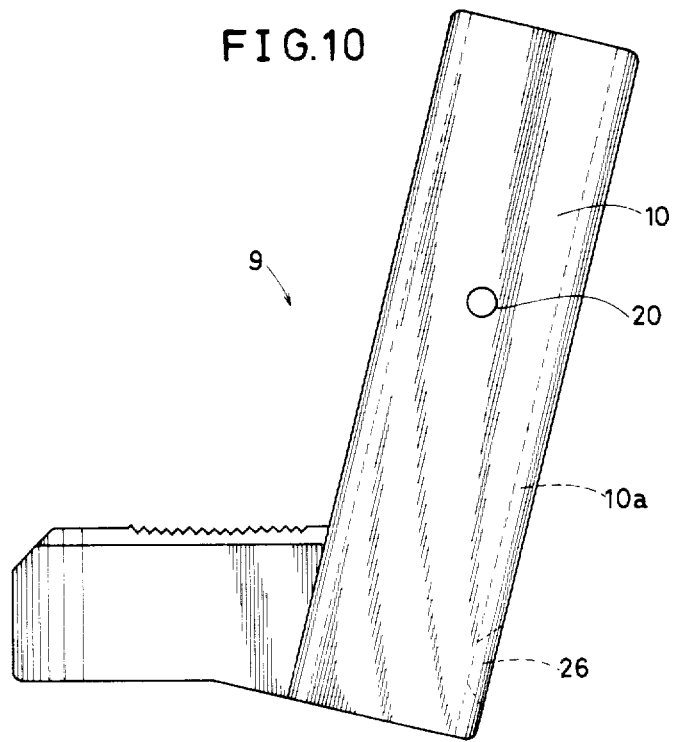
FIG. 10 is a side view of the footrest.

FIGS. 9 and 10 are plan and side views, respectively, of the footrest 9. Referring to FIGS. 2, 9 and 10, the sleeve 10 of the footrest 9 has the same cross-sectional size as that of the lower front leg 5b. And, as shown in FIG. 2, the sleeve 10 surrounds the upper front leg 5a. Therefore, the sleeve 10 is capable of sliding on and along the upper front leg 5a. In response to the sliding movement of the sleeve 10, the entire footrest 9 will slide. In the state shown in FIG. 2, the lower end surface of the sleeve 10 abuts against the upper end surface of the lower front leg 5b, whereby the maximum extent of the downward sliding movement of the sleeve 10 is defined.

Referring to FIGS. 2, 7 and 8, the upper region of the insert member 11 has an upper space 16 defined therein by a front wall 11a, a rear wall 11b, a top wall 11c and a central wall lid. In addition, the upper region of the insert member 11 has no lateral walls formed thereon. Therefore, the upper space 16 extends through in the horizontal direction. As shown in FIG. 2, a vertically movable spring seat member 17 is disposed in the upper space 16, and a spring 18 is disposed between said spring seat member 17 and the top wall 11c of the insert member 11. Therefore, the spring seat member 17 is constantly biased downwardly by the action of the spring 18. In the state shown in FIG. 2, the bottom surface of the spring seat member 17 abuts against the central wall 11d of the insert member 11, whereby the further downward movement of the spring seat member 17 is inhibited.

Referring to FIGS. 2 and 4, in connection with the aforesaid spring seat member 17, side walls of the upper front leg 5a are formed with a vertically extending elongated hole 19. Further, referring to FIG. 10, the sleeve 10 of the footrest 9 is formed with a throughgoing hole 20. A pin 21 extending through the spring seat member 17 shown in FIG. 2 fits into the throughgoing hole 20 after passing through the elongated hole 19. Therefore, it follows that the spring seat member 17 and the sleeve 10 are connected to each other by the pin 21, with the result that the spring seat member 17 and the footrest 9 will move as a unit. The range of this movement is the same as the range in which the pin 21 can be moved in the elongated hole 19. In the state shown in FIG. 2, the spring seat member 17 is downwardly biased by the action of the spring 18. This means that the footrest 9 is biased downwardly. The maximum extent of this downward movement is defined by the lower end surface of the sleeve 10 abutting against the upper end surface of the lower front leg 5b, as described above.

Referring to FIGS. 2 and 3, the upper front leg 5a has an engagement hole 22 in the portion where it overlaps the sleeve 10 of the footrest 9. Corresponding to this engagement hole 22, as shown in FIGS. 2 and 7, the insert member 11 is also formed with a receiving hole 23. The receiving hole 23 and the engagement hole 22 are aligned with each other, and the front end of the receiving hole 23 is smaller in diameter than the other portions thereof. Disposed in the receiving hole 23 is an engagement pin 24 capable of sliding in the direction of the length of said receiving hole. The engagement pin 24 has its middle portion made larger in diameter than the other portions thereof, and a spring 25 is positioned between the central portion of said engagement pin and the front end 23a of said receiving hole 23. The spring 25 causes the engagement pin 24 to slide to the right as viewed in the figure. In the state shown in FIG. 2, the front end 24a of the engagement pin 24 extends through the engagement hole 22 of the upper front leg 5a to abut against the sleeve 10 of the footrest 9.

Referring to FIGS. 2 and 10, the sleeve 10 of the footrest 9 has a locking hole 26 in the wall thereof opposite to the engagement hole 22 of the upper front leg 5a, i.e., in the rear wall 10a. The locking hole 26 and engagement hole 22 are located in such positions that they will be aligned with each other when the upper front leg 5a and the sleeve 10 are brought into a predetermined positional relationship. In addition, in the embodiment shown in FIG. 2, the locking hole 26 is formed adjacent the lower end of the sleeve 10.

Figure 11:
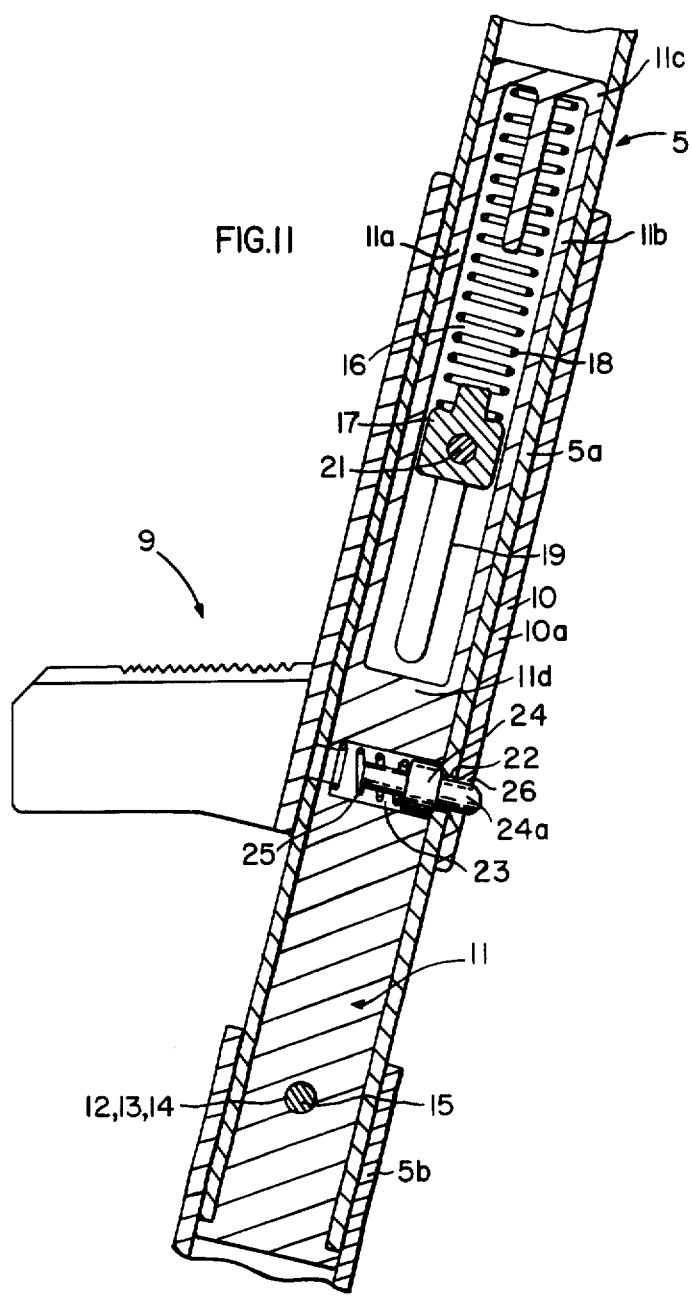
FIG. 11 is a central sectional view showing the state reached after the footrest has been slid upwardly from the state of FIG. 2.

Suppose that it is necessary to raise the level of the footrest 9. In this case, the footrest 9 is slid upwardly against the force of the spring 18. When the footrest 9 has been moved upwards by a predetermined amount, when the locking hole 26 being aligned with the receiving hole 22, the engagement pin 24 disposed in the receiving hole 23 of the insert member 11 is slid to the right as viewed in the figure by the action of the spring 25. This state is shown in FIG. 11. In the state shown in FIG. 11, the engagement pin 24 extends through both the engagement hole 22 of the upper front leg 5a and the locking hole 26 of the sleeve 10. Thus, the upward movement of the sleeve 10 and hence of the footrest 9 is inhibited; in this way, the level of the footrest 9 is fixed.

When it is desired to move the footrest 9 back to the state shown in FIG. 2, a suitable rod or the like is used to push in the front end 24a of the engagement pin 24 and then the footrest 9 is slid downwards.

The embodiment shown in FIGS. 1 through 11 is only an example of the invention. Therefore, various changes or modifications are possible. Some changes are described below.

Change 1

Referring to FIG. 2, it is not always necessary that the engagement pin 24 be built in. That is, a suitable pin may be inserted from outside into the engagement hole 22 and locking hole 26 which are aligned with each other when the footrest 9 is slid upwardly. If the engagement pin 24 is built in as shown in FIG. 2, however, there is an advantage that the engagement pin 24 will not be lost.

Change 2

Referring to FIG. 2, in the illustrated state, the downward slide of the footrest 9 is stopped when by the lower end surface of the sleeve 10 abuts against the upper end surface of the lower front leg 5b. However, in FIG. 2, if the portion of the sleeve 10 against which the front end 24a of the engagement pin 24 is abutting is formed with a locking hole similar to the locking hole 26, then the downward slide can be ended even if the lower end surface of the sleeve 10 does not abut against the upper end surface of the lower front leg 5b. Further, since the upward slide is also prevented in this case, the spring 18 shown in FIG. 2 becomes unnecessary.

Change 3

In the embodiment described above, the level of the footrest is adjusted in two steps. However, it could be adjusted in three or four or more steps. That is, if a number of locking holes 26 are formed, the level of the footrest can be adjusted in many steps.

Change 4

In the aforesaid embodiment, the level of the footrest 9 is changed by sliding the footrest. However, it is not always necessary that the footrest 9 be slidable along the front legs 5. In brief, the invention is characterized in that the level of the footrest is adjustable, and this may be embodied by an arrangement other than the one disclosed in the embodiment described above. For example, there may be contemplated an arrangement wherein the footrest is designed to be removably attached to the front legs while the latter are provided with some locations for attaching or receiving such footrest. Further, the footrest may be rotatably installed so that its level is changed by turning the footrest.

In FIGS. 12 through 19, another embodiment of the invention is shown.

Figure 12:
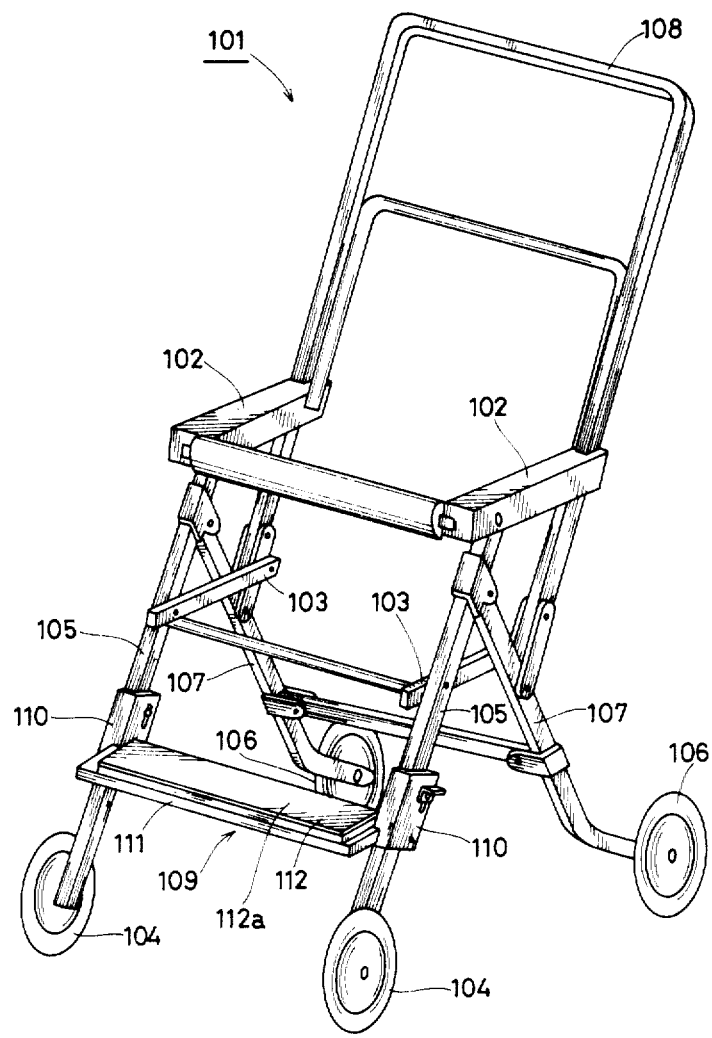
FIG. 12 is a perspective view of another embodiment of the invention.

Referring to FIG. 12, a baby carriage 101 comprises a pair of longitudinally extending handrails 102, seat support rods 103 for supporting a seat, a pair of front legs 105 attached at their upper ends to the handrails 102 and having at their lower ends front wheels 104, a pair of rear legs 107 attached at their upper ends to the front legs 105 and having at their lower ends rear wheels 106, and a U-shaped push rod 108. A footrest 109 extends between and is attached to the front legs 105.

The footrest 109 comprises a pair of sleeves 110 surrounding the front legs 105, a lower plate 111 fixedly attached between the sleeves 110, and an upper plate 112 placed on said lower plate.

Figure 13:
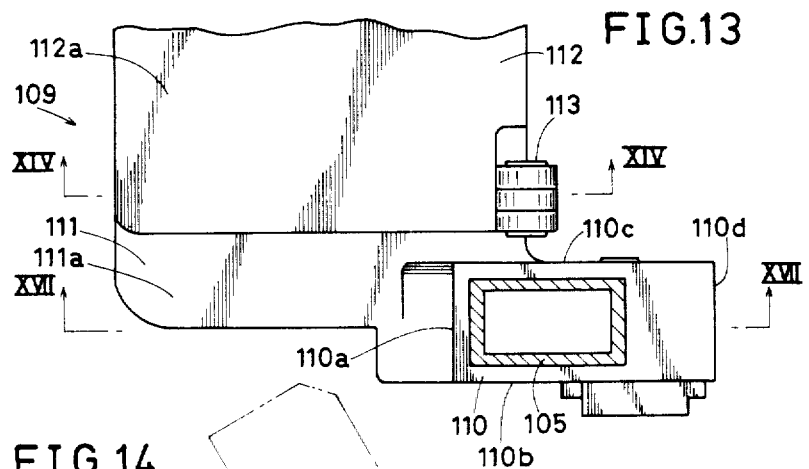
FIG. 13 is a plan view of the left-hand portion of a footrest shown in FIG. 12.
Figure 14:
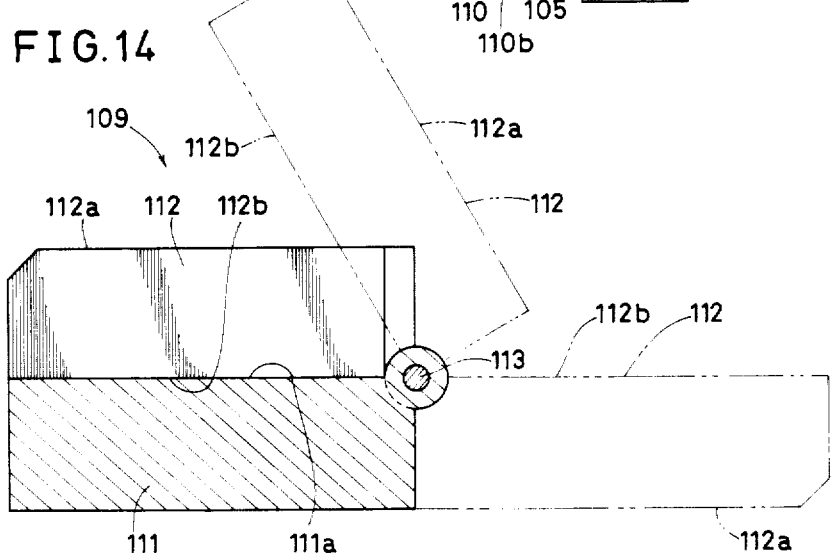
FIG. 14 is a sectional view taken along the line XIV—XIV in FIG. 13.

Referring to FIGS. 13 and 14 as well as FIG. 2, the upper and lower plates 112 and 111 of the footrest 109 are hinged together at their rear ends by a pin 113. Therefore, the upper plate 112 can be raised and rotated backwardly as shown in phantom lines in FIG. 14. The maximum extent of the turning movement of the upper plate 112 is defined by the rear end surface of the upper plate 112 abutting against the rear end surface of the lower plate 111.

Figure 15:
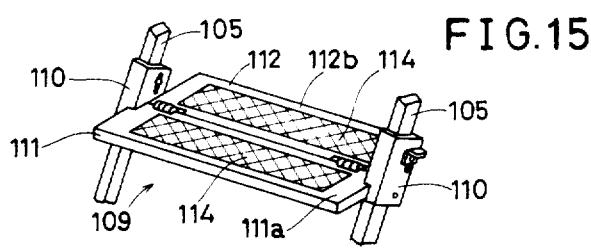
FIG. 15 is a perspective view showing the state reached after the upper plate of the footrest has been raised and rotated backwards from the state shown in FIG. 12.

FIG. 15 shows the state reached after the upper plate 112 has been rotated backwards. In the state shown in FIG. 12, the upper surface 112a of the upper plate 112 appears in the position for receiving the infant's feet. In the state shown in FIG. 15, the upper surface 111a of the lower plate 111 appears in the position for receiving the infant's feet. Thus, when the infant is wearing shoes, for example, the upper surface 112a of the upper plate 112 may be used as the foot support surface as shown in FIG. 12, while when the infant is not wearing shoes, the upper surface 111a of the lower plate 111 may be used as the foot support surface as shown in FIG. 15. In addition, when the upper plate 112 has been opened as shown in FIG. 15, the lower surface 112b of the upper plate 112 together with the upper surface 111a of the lower plate 111 may be used as the foot support surface. Considering that bare feet will be placed on the upper surface 111a of the lower plate 111 and the lower surface 112b of the upper plate 112, it would be desirable that a soft fabric 114 be laid on these surfaces.

The footrest 109 is arranged so that its level can be adjusted as required. Thus when a baby or infant with a small body is to be set on the seat, the level of the footrest can be raised, while when an infant with a big body is to be set on the seat, the level of the footrest can be lowered.

The footrest 109 has a pair of sleeves 110 on opposite sides to surround the front legs 105, as described above. A mechanism for adjusting the level of the footrest 109 is provided in association with said sleeve 110 and said front legs 105. Such footrest level adjusting mechanisms are provided on both the right and left sides, but since they are substantially the same, only the footrest level adjusting mechanism provided on the left side will be described.

Figure 16:
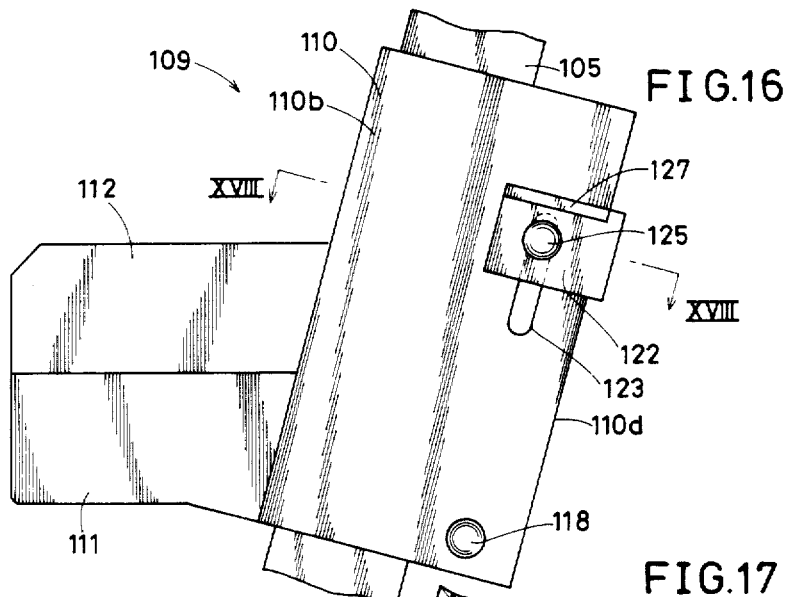
FIG. 16 is an enlarged side view of a portion where a sleeve for the footrest overlaps a front leg.
Figure 17:
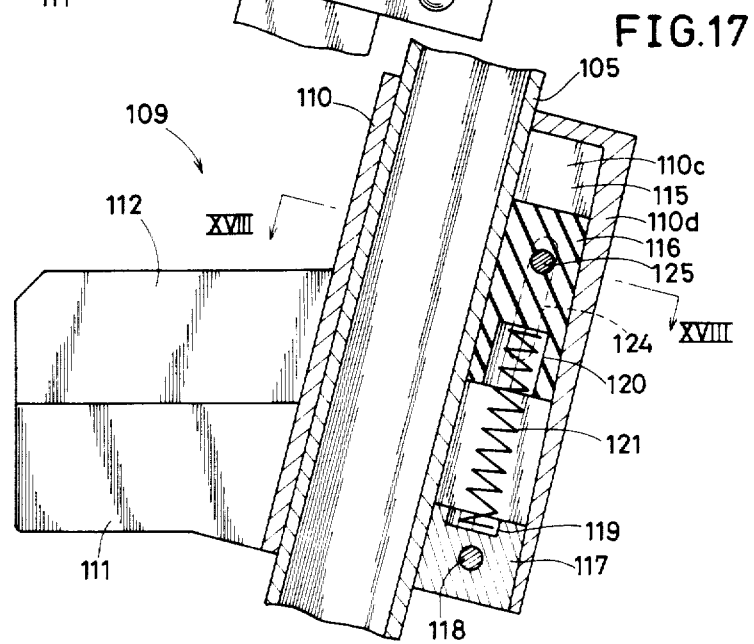
FIG. 17 is a sectional view taken along the line XVII—XVII in FIG. 13.

FIGS. 13 and 16 show on an enlarged scale a portion where the sleeve 110 of the footrest 109 overlaps the front leg 105. FIG. 17 is a side sectional view taken along the line XVII—XVII in FIG. 13, and FIG. 18 is an end view taken along the line XVIII—XVIII in FIGS. 16 and 17.

As is clear from each figure, the sleeve 110 is shaped to surround the front leg 105. Thus, the sleeve 110 is capable of sliding along and on the front leg 105. And in response to the sliding movement of the sleeve 110, the entire footrest 105 is slid.

The sleeve 110 comprises a front wall 110a, a left-hand side wall 110b, a right-hand side wall 110c, and a rear wall 110d. As best shown in FIG. 17, a clearance 115 is defined between the rear wall 110d of the sleeve 110 and the outer surface of the front leg 105. Thus, the rear wall 110d forms a wall remote from the front leg 105, i.e., a remote wall. The shape of the inner wall surface of the remote wall forming the rear wall 110d is such that the distance between it and the outer surface of the front leg 105 is gradually narrowed toward the top. In the illustrated embodiment it is tapered.

Figure 18:
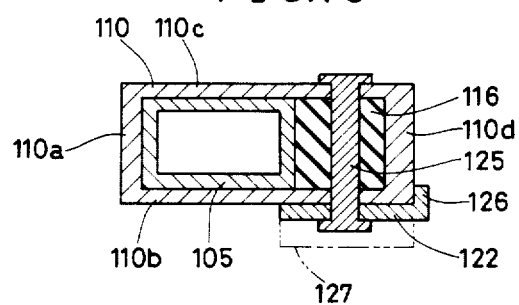
FIG. 18 is an end view taken along the line XVIII—XVIII in FIG. 17 and FIG. 16.

Referring to FIGS. 17 and 18, disposed in the clearance 115 defined between the inner wall surface of the rear wall 110d of the sleeve 110 and the outer surface of the front leg 105 is a stopper 116 which is vertically movable in said clearance. When the stopper 116 is in the limit position of its upward movement in the clearance, i.e., in the position shown in FIG. 17, it is pressed against the inner wall surface of the rear wall 110d of the sleeve 110 and against the outer surface of the leg 105 opposite thereto. Therefore, large amounts of frictional force are produced between the stopper 116 and the front leg 105 and between the stopper 116 and the rear wall 110d of the sleeve 110, with the result that the slide movement of the sleeve 110 relative to the front leg 105 is inhibited. In addition, in order to increase said frictional forces, the stopper 116 is preferably made of rubber or the like.

As shown in FIG. 17, a spring seat member 117 is disposed in the lower region of the clearance 115. The spring seat member 117 is fixed to the sleeve 110 by fixing pin 118 extending through left-hand and right-hand side walls 110b and 110c of the sleeve 110. The upper surface of the spring seat member 117 and the bottom surface of the stopper 116 are formed with spring receiving holes 119 and 120, respectively. A spring 121 is installed so that it is positioned in these spring receiving holes 119 and 120. The spring 121 constantly causes the stopper 116 to move upward. Thus, by the action of the spring 121, the stopper is brought to the uppermost position to which it is allowed to move, thereby inhibiting the slide movement of the sleeve 110, as described above.

Disposed on the left-hand side wall 110b of the sleeve 110 is an operating member 122 for moving the stopper 116 downward. The operating member 122 is connected to the stopper 116 in the following manner. The left-hand and right-hand side walls 110b and 110c of the sleeve 110 are provided with elongated holes 123 and 124, respectively, extending along the longitudinal axis of the front leg 105. A pin 125 is installed which extends successively through the elongated hole 123, the stopper 116 and the elongated hole 124, whereby the pin 125, guided by the holes 123, 124, guides the stopper 116 along and in contact with said front leg as shown in FIG. 17. One end of the pin 125 projects beyond the left-hand side wall 110b of the sleeve 110, with the operating member 122 fixedly attached to the projecting portion. Thus, the stopper 116 and the operating member 122 will move as a unit by means of the intermediary pin 125. The elongated holes 123 and 124 allow such movement. Referring to FIGS. 16 and 18, the operating member 122 has a hem portion 126 extending along the outer surface of the rear wall 110d of the sleeve 110, and a handle portion 127 projecting to the left-hand side, or toward the reader as viewed in FIG. 16. The hem portion 126 serves to properly guide the operating member 122, while the handle portion 127 serves to make it easier for the person who operates the operating member 122 to move the operating member 122 by hand.

Figure 19:
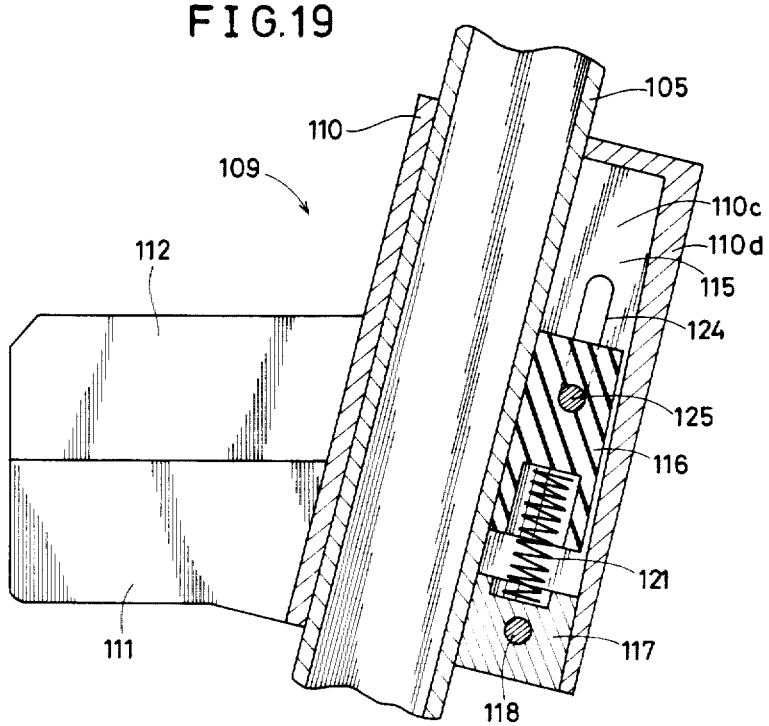
FIG. 19 is a view showing the state reached after a stopper has been moved downwardly from the state shown in FIG. 17.

Suppose that it is necessary to change the level of the footrest 109. In this case, first, the operating member 122 is moved downward against the force of the spring 121. Then, the stopper 116 is also moved downward. This state is shown in FIG. 19. As is clear from this figure, since the inner wall surface of the rear wall 110d of the sleeve 110 is shaped so that the distance between it and the outer surface of the front leg 105 is gradually widened toward the bottom, the downward movement of the stopper 116 results in a clearance being formed between the stopper 116 and the inner wall surface of the rear wall 110d. Consequently, the frictional force between the stopper 116 and the rear wall 110d of the sleeve 110d disappears, and the frictional force between the stopper 116 and the front leg 105 is decreased to a minimum. As a result, the sleeve 110, i.e., the footrest 109 is allowed to slide on the front leg 105. In this way, the footrest 109 is moved to a desired position. Then when the operator loosens her grip on the operating member 122, the stopper 116 is moved to the uppermost position by the action of the spring 121. This is the state shown in FIG. 17. In this state, the slide movement of the footrest 109 is inhibited by the frictional forces between the stopper 116 and the front leg 105 and between the stopper 116 and the rear wall 110d of the sleeve 110. In this way, the footrest is fixed at a desired level.

Various changes or modifications of the embodiment shown in FIGS. 12 through 19 are possible. Some changes are described below.

Change 1

In the footrest 109 shown in FIG. 12 the lower and upper plates 111 and 112 are positioned in the lowermost region of the sleeve 110. However, the lower and upper plates 111 and 112 may be positioned in the uppermost region of the sleeve 110. With such an arrangement, when the footrest 109 has been moved to the uppermost position to which it is allowed to move, the lower and upper plates 111 and 112 can be used as an extension of the seat.

Change 2

Figure 20:
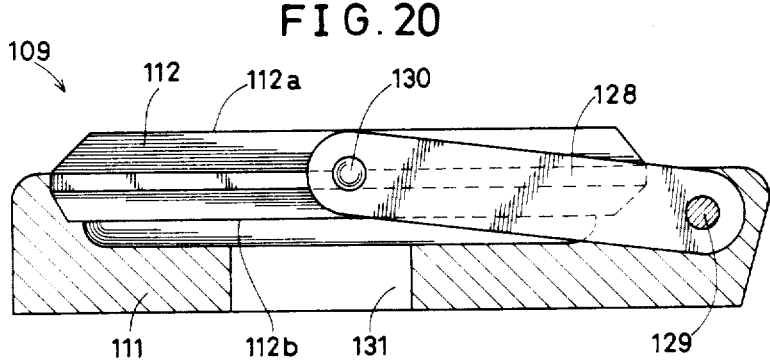
FIG. 20 is a diagrammatic side view of the principal portions of a further embodiment of the invention.
Figure 21:
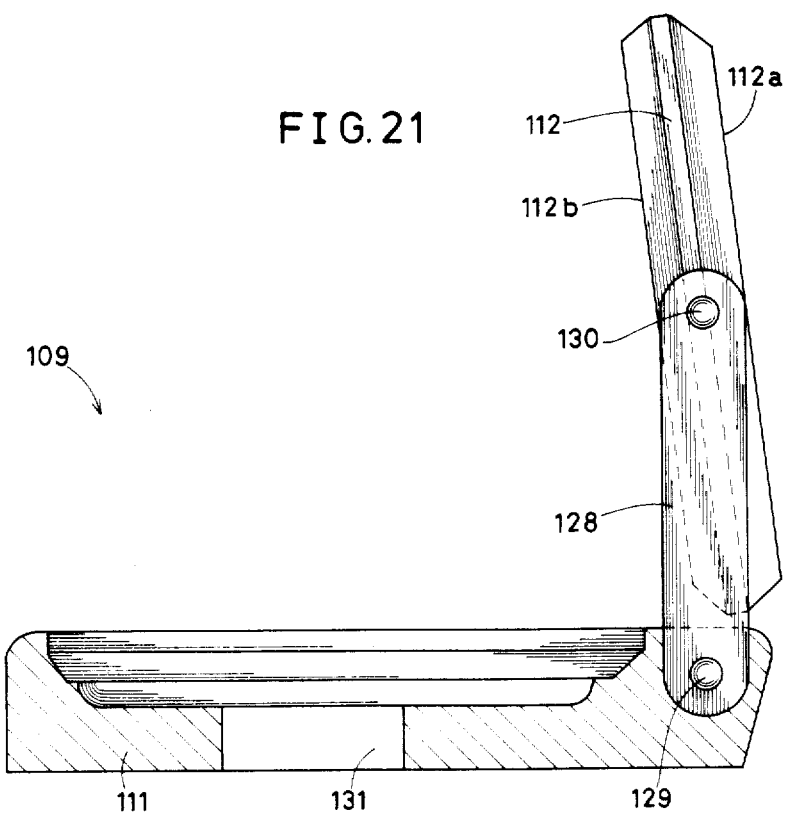
FIG. 21 is a view showing the state reached after a connecting member has been raised from the state shown in FIG. 20.

FIGS. 20 and 21 are diagrammatic views of the principal portions of another embodiment of this invention. In this embodiment, the footrest 109 comprises upper and lower plates 112 and 111 which are superposed on each other, and an which connects member 128 connecting said upper and lower plates 112 and 111 to each other. The connecting member 128 is rotatably attached to one end thereof to the rear side of the lower plate 111 by a pin 129 and at the other end to the lateral middle portion of the upper plate 112. The upper surface 112a of the upper plate 112 forms a first foot support surface and the lower surface 112b thereof forms a second foot support surface. In the state shown in FIG. 20, the upper surface 112a of the upper plate 112 appears in the foot support position. When it is desired to change this state so that the lower surface 112b of the upper plate forming the foot support surface appears in the foot support position, the connecting member 128 is raised, as shown in FIG. 21. To facilitate this operation, the lower plate 111 is preferably formed with a throughgoing hole 131. Thus, the operator will first insert his or her hand into the throughgoing hole 131 from below to lift the upper plate 112. Then, the state shown in FIG. 21 can be easily established. From the state shown in FIG. 21, the upper plate 112 is turned until its lower surface 112b faces up. The connecting member 128 is then lowered to put the upper plate 112 on the lower plate 111; thus, the lower surface 112b of the upper plate 112 appears in the foot support position.

Change 3

Figure 22:
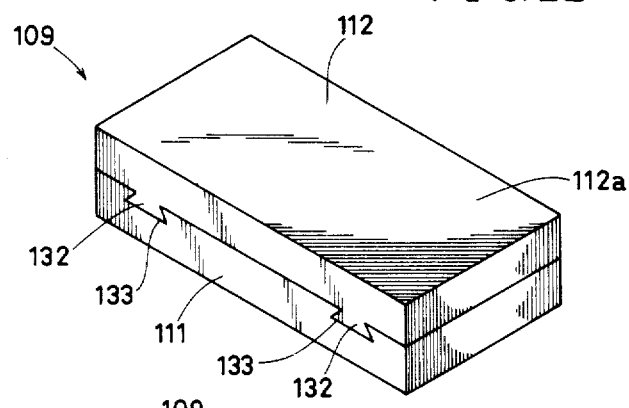
FIG. 22 is a diagrammatic perspective view showing still another embodiment of the invention.
Figure 23:
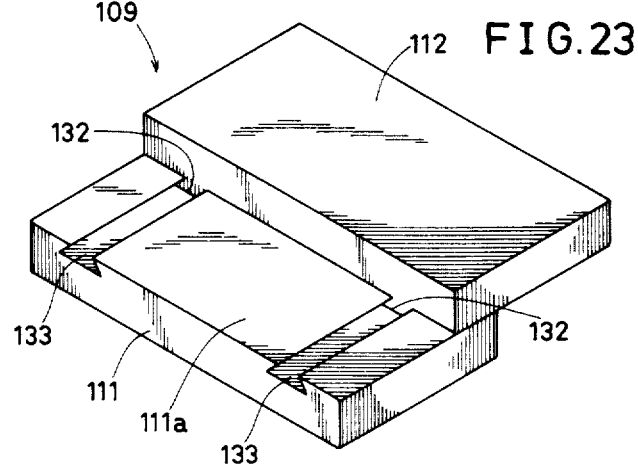
FIG. 23 is a view showing the state reached after an upper plate has been slid rearwardly from the state shown in FIG. 22.

FIGS. 22 and 23 show the principal portions of another embodiment of the invention. In this embodiment, the footrest 109, as in the preceding embodiment, comprises an upper plate 112 and a lower plate 111 which are superposed to each other. The difference from the preceding embodiment is that the upper plate 112 is slidable on the lower plate 111. That is, the bottom surface of the upper plate 112 is formed with dovetails 132, and the upper surface 111a of the lower plate 111 is formed with dovetail grooves 133 adapted to receive said dovetails 132. The upper surface 112a of the upper plate 112 forms a first foot support surface, while the upper surface 111a of the lower plate 111 forms a second foot support surface. In the state shown in FIG. 22, the upper surface 112a of the upper plate 112 appears in the foot support position. If the upper plate 112 is slid rearwardly, as shown in FIG. 23, the upper surface 111a of the lower surface 111 appears in the foot support position.

FIGS. 24 through 30 show a further embodiment of the invention.

Referring to FIG. 24, a baby carriage 201 comprises a pair of longitudinally extending handrails 202, seat support rods 203 for supporting a seat, a pair of front legs 205 attached at their upper ends to the handrails 202 and having at their lower ends front wheels 204, and a U-shaped push rod 208. A footrest 209 extends between and is attached to the front legs 205. Rear legs 207 with rear wheels 206 are connected to the top of the front legs 205. The push rod 208 is connected to the rear legs 207 and to the hand rails or arm rests 202.

The footrest 209 comprises a foot support member 210 for supporting an infant's feet when the infant is set on the seat, and a pair of sleeves 211 installed on the right and left sides of the foot support member 210. The sleeves 211 surround the front legs 205 and are vertically slideable thereon. In connection with the sleeves 211 and the front legs 205, a mechanism for adjusting the level of the footrest 209 is provided. Such footrest level adjusting mechanisms are provided on both sides, but since they are substantially the same, only the footrest level adjusting mechanism provided on the left side will be described.

Figure 26:
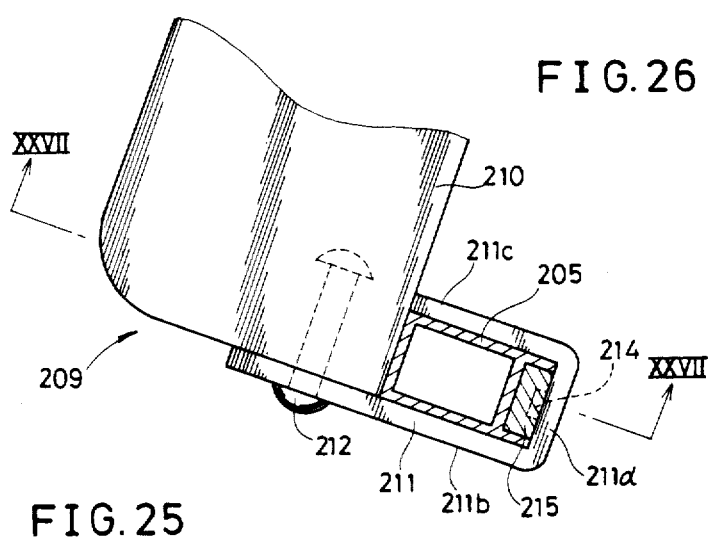
FIG. 26 is a view taken along the line XXVI—XXVI in FIG. 25.
Figure 25:
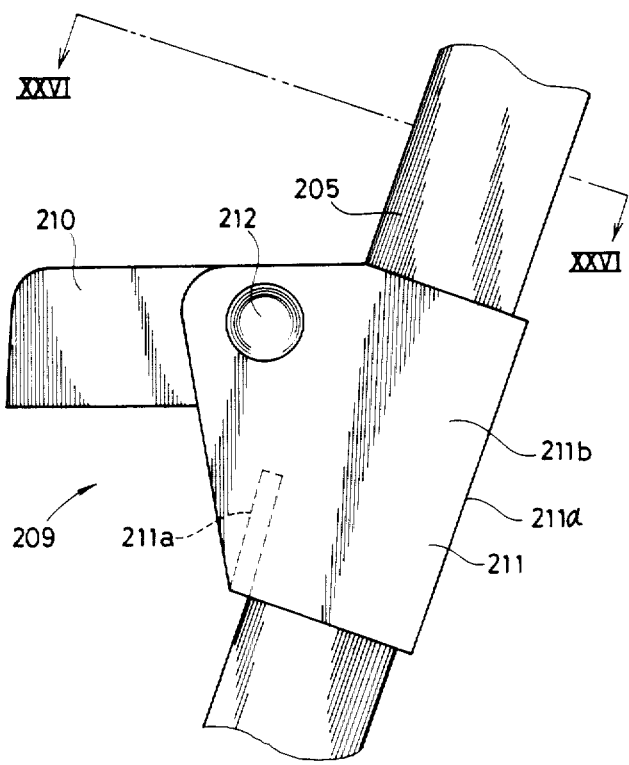
FIG. 25 is an enlarged side view of a portion where a sleeve for a footrest overlaps a front leg shown in FIG. 24.
Figure 27:
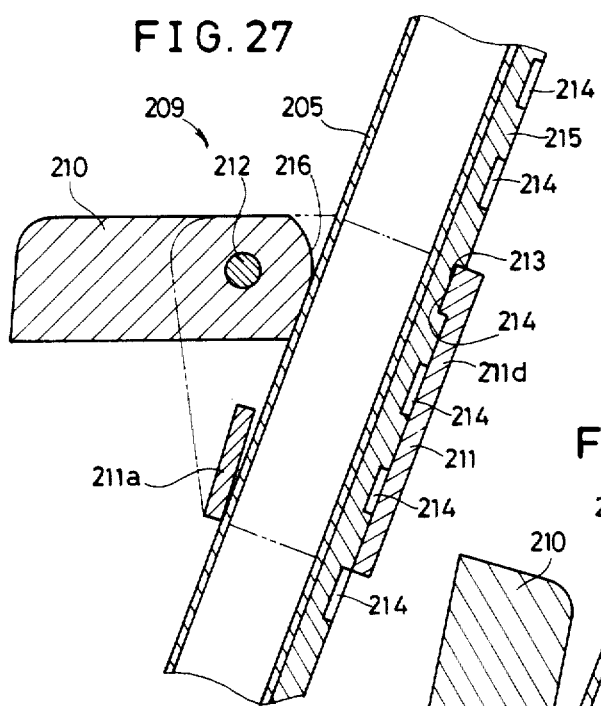
FIG. 27 is a side sectional view of the principal portions of the embodiment shown in FIG. 24, taken along the line XXVII—XXVII in FIG. 26.

FIGS. 25 and 26 shown on an enlarged scale a portion where the sleeve 211 of the footrest 209 overlaps the front leg 205. FIG. 27 is a side sectional view taken along the line XXVII—XXVII in FIG. 26.

As is clear from these figures, the sleeve 211 is shaped to surround the front leg 205. More particularly, the sleeve 211 comprises a front wall 211a, a left-hand side wall 211b, a right-hand side wall 211c, and a rear wall 211d. Therefore, the sleeve 211 is slideable along and on said front leg 205. In response to the sliding movement of the sleeve 211, the entire footrest 209 is slid.

As shown in FIGS. 25 and 27, the front wall 211a of the sleeve has no wall in its upper portion, where the outer surface of the front leg 205 is exposed. Further, in the state shown in FIG. 27, the front wall 211a does not extend parallel to the front leg 205, but instead is inclined so that its upper end is separated from the front leg 205. The left-hand side wall 211b of the sleeve 211 projects forward and the projecting portion has the foot support member 210 rotatably connected thereto by a pin 212. The foot support member 210 is rotatably at least between a first position shown in FIG. 27 and a second position shown in FIG. 28.

The rear wall 211d of the sleeve 211 forms an engaging wall capable of engaging the outer surface of the front leg 205. More particularly, in this embodiment, the upper end of the rear wall 211d is formed with an engaging projection 213. The outer surface of the front leg 205 opposite to the rear wall 211d is formed with a plurality of vertically aligned engaging recesses 214. These engaging recesses may be formed directly in the front leg 205, but in this embodiment, a member 215 formed with such engaging recesses 214 is previously installed in the front leg 205 as by a pin, as shown in FIG. 26.

The foot support member 210 has an abutment surface 216 capable of abutting against the outer surface of the front leg 205 on the side opposite to the rear wall 211d of the sleeve 211. The shape of the abutment surface 216 is shown enlarged in FIGS. 29 and 30. As illustrated, the abutment surface 216 includes an arcuate surface spaced by a distance R from the center of rotation of the foot support member 210, a large diameter portion 216a relatively greater than the radius R, and a small diameter portion 216b relatively smaller than the radius R.

Figure 29:
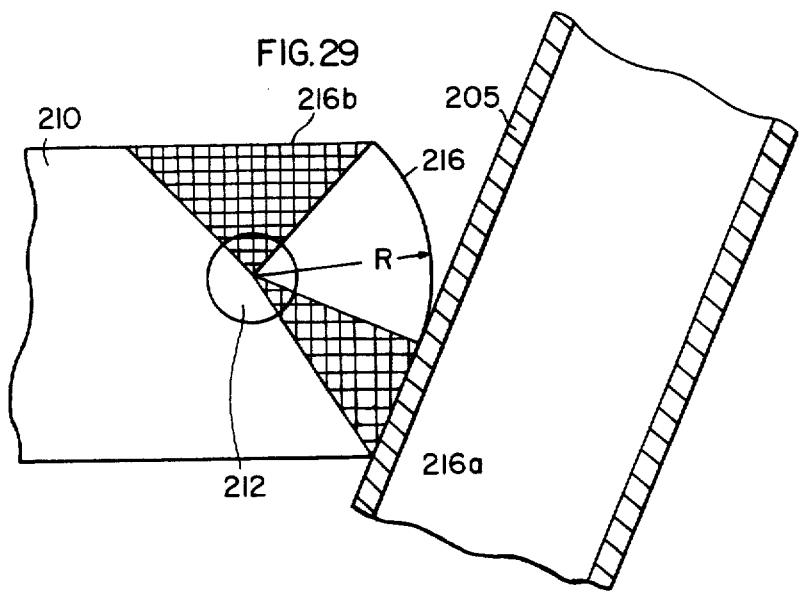
FIG. 29 is a view for clarifying the shape of the abutment surface of the foot support member.

When the foot support member 216 is in the first position as shown in FIGS. 27 and 29, the large diameter portion 216a abuts against the outer surface of the front leg 205. In this case, the engaging projection 213 on the sleeve 211 engages an engaging recess 214 of the front leg 205, thereby inhibiting the vertical slide movement of the sleeve 211.

Figure 28:
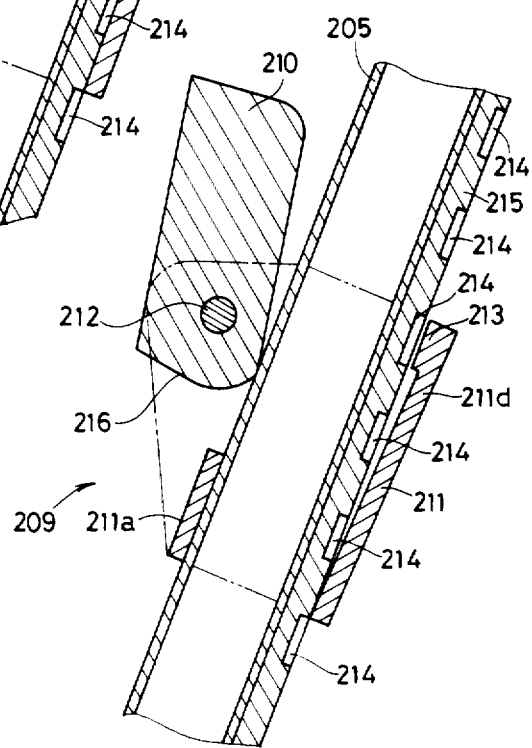
FIG. 28 is a view showing the state reached after a foot support member has been rotated from the state shown in FIG. 27.
Figure 30:
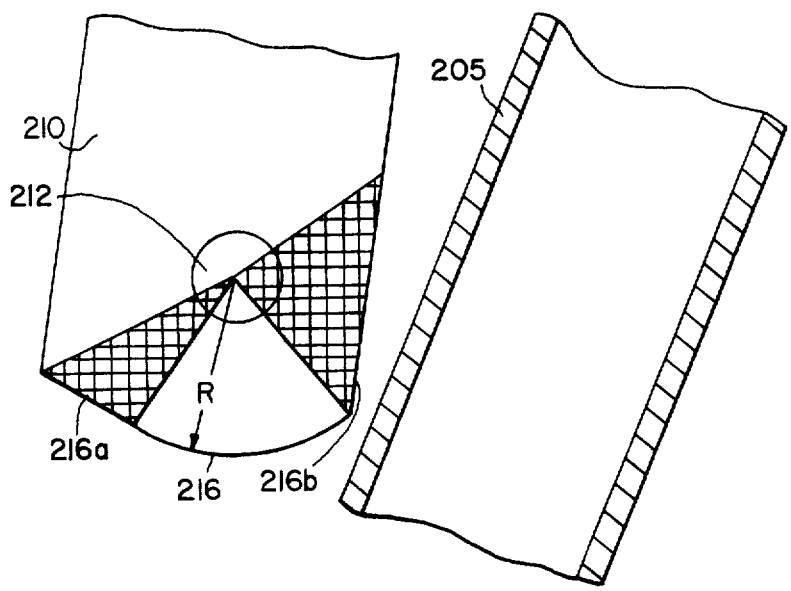
FIG. 30 is a view showing the state reached after the foot support member has been rotated from the state shown in FIG. 29.

Next, as shown in FIGS. 28 and 30, if the foot support member 216 is turned clockwise as viewed in the figures to the second position, the small diameter portion 216b of the foot support member 216 comes to abut against the outer surface of the front leg 205. If the sleeve 211 were immovable irrespective of the turning movement of the foot support member 210, there would be a clearance produced between the foot support member 210 and the front leg 205, as shown in FIG. 30. When the sleeve 211 is tilted clockwise as viewed in the figure to eliminate the clearance, the engagement between the engaging projection 213 on the sleeve 211 and the engaging recess 214 of the front leg 205 is eliminated, as shown in FIG. 28. To allow this tilting movement of the sleeve 211, the front wall 211a of the sleeve 211 is slightly inclined, as described above.

In the state shown in FIG. 28, the sleeve 211 is allowed to slide vertically along the front leg 205. Thus, the footrest 209 is moved to a desired position and then the foot support member 210 is turned counterclockwise as viewed in the figure to the first position. In this way, the footrest 209 is fixed at a desired level. In the state shown in FIGS. 27 and 29, if feet are placed on the foot support member 210, the latter is forced to turn further counterclockwise, increasing the pressing force on the front leg 205. Therefore, the sleeve 211 is fixed more firmly to the front leg 205.

Various changes or modifications of the embodiment shown in FIGS. 24 through 30 are possible. Some changes are described below.

Change 1

Figure 31:
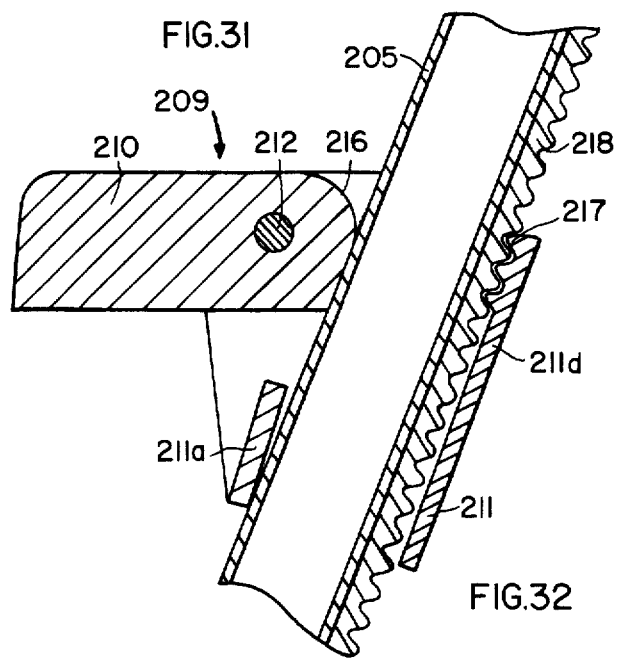
FIG. 31 is a side sectional view of the principal portions of another embodiment of the invention.

Referring to FIG. 31, the rear wall 211d of the sleeve 211 forming an engaging wall is formed with engaging projections 217. The front leg 205 opposite to this rear wall 211d is formed with sawtooth-like teeth 218 engageable with the engaging projections 217. In this embodiment as in the above described embodiment, when the foot support member 210 is in the first position shown, the engaging projections 217 engage sawtooth-like teeth 218, thereby inhibiting the sliding movement of the sleeve 211. If the foot support member 210 is turned clockwise as viewed in the figure, the engagement is eliminated, thereby allowing the sliding movement of the sleeve 211.

Change 2

Figure 32:
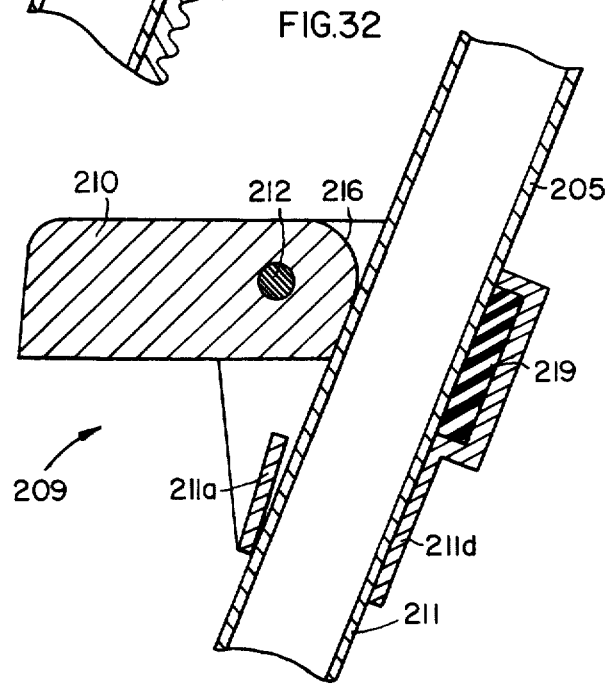
FIG. 32 is a side sectional view of the principal portions of another embodiment of the invention.

Referring to FIG. 32, the upper portion of the rear wall 211d of the sleeve 211 forming an engaging wall is shaped to form a receiving space between it and the front leg 205. An engaging press member 219 is disposed in said receiving space. The engaging press member 219 is tapered such that its cross-section is gradually thicker toward the top. As shown in FIG. 32, when the foot support member 210 is in the first position, the engaging press member 219 engages the front leg 205, and the resulting frictional force inhibits the sliding movement of the sleeve 211. If the foot support member 210 is turned clockwise as viewed in the figure, the engagement between the engaging press member 219 and the front leg 205 is eliminated, so that the frictional force between them disappears. As a result, it becomes possible for the sleeve 211 to slide along the front leg 205. In addition, to increase frictional force between the engaging press member 219 and the front leg 205, it is preferable that the engaging press member 219 be made of rubber or the like.

Change 3

Referring to FIG. 33, the upper portion of the rear wall 211d of the sleeve 211 forming an engaging wall is formed with a pressing projection 220. Corresponding thereto, the front leg 205 has mounted thereon a soft body 221 which is press-engageable with the pressing projection 220. For the soft body 221, rubber or the like is employed. In the state shown in FIG. 33, the pressing projection 220 and the soft body 221 are in press engagement, the resulting frictional force therebetween inhibiting the sliding movement of the sleeve 211. If the foot support member 210 is turned, the pressing projection 220 is disengaged from the soft body 221 thereby, enabling the sleeve 211 to slide.

Change 4

Referring to FIG. 34, if the footrest 209 is moved to the uppermost position to which it is allowed to move, the footrest 209 can be used as an extension of the seat of the baby carriage. Considering that the footrest 209 may be used as an extension of the seat, it is preferable that the foot support member 210 be so constructed that its width dimension can be extended. An example of such a construction is shown in FIG. 34. In the illustrated embodiment, the foot support member 222 comprises an upper plate 222a and a lower plate 222b which are superposed on each other. The upper and lower plates 222a and 222b are hinged together at their front ends by a pin 223. Therefore, the upper plate 222a is allowed to rotate forwardly as shown in phantom lines in FIG. 34. The maximum extent of this turning of the upper plate 222a is defined by the front end surface of the upper plate 222a abutting against the front end surface of the lower plate 222b.

Change 5

In each of the embodiments described above, the foot support member 210 or 222 is rotated in order to end the engagement between the sleeve and the front leg. That is, the foot support member 210 or 222 has the function of a turning operating lever. As a change, however, the foot support member 210 or 222 may be fixed to the sleeve 211. In this case, the pair of sleeves 211 will each be provided with a lever for disengaging the sleeve from the front leg. This lever should have an abutment surface as in the foot support member in each embodiment described above. In each of the embodiments described above, it is understood that this lever extends between the two sleeves, thereby serving the function of a foot support member as well.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A baby carriage, comprising footrest means, a pair of front legs having front wheels attached to lower ends of said front legs, said footrest means extending between said pair of front legs, a pair of slide means secured to said footrest means and slidably engaging each of said front legs for up and down movement of said footrest means along said front legs, whereby said pair of front legs function as guide rods for an upward and downward sliding movement of said footrest means, means for inhibiting said sliding movement of said footrest means, and means for fixing the level of said footrest means at a desired position, said footrest means comprising a foot support member for supporting the feet of an infant placed on the seat of the baby carriage, each of said slide means having a remote wall forming a clearance between it and an outer surface of said front leg and opposite to said outer front leg surface, said remote wall having an inner wall surface with a shape such that the clearance between it and the outer surface of said front leg in gradually narrowed toward the top, said inhibiting means comprising a stopper vertically movable in the clearance between the inner wall surface of said remote wall and the outer surface of said front leg, whereby said stopper in its upper limit position is pressed against the inner wall surface of said remote wall and against the outer surface of said front leg opposed thereto, thereby inhibiting said slide means for sliding relative to said front leg, said footrest means further including a spring for constantly urging said stopper to move upward, and guide means (123, 124, 125) arranged for guiding said stopper along and in parallel with said outer front leg surface, whereby said stopper (116) is in frictional contact with said outer front leg surface at all times, and wherein said guide means comprise elongated holes (123, 124) in said slide means, and a pin (125) passing through said stopper (116) and through said elongated holes (123, 124), said elongated holes (123, 124) extending in parallel to said outer front leg surface for said guiding of said stopper along said front leg.

2. The baby carriage of claim 1, further comprising an operating member (122) secured to said guide pin (125) for operating said stopper (116) downwardly against said spring.

3. The baby carriage of claim 1, wherein said stopper (116) is made of rubber for increasing frictional forces to hold said footrest means at all times.

4. The baby carriage of claim 1, wherein said foot support means for supporting the feet of an infant is so arranged that its width dimension can be extended.

5. The baby carriage of claim 1, wherein said foot support means comprise an upper plate and a lower plate which are superposed on each other, said upper plate being turnably connected at its front end to said lower plate for extending said width dimension.

6. The baby carriage of claim 1, wherein said footrest means comprise first and second foot support surfaces which are adapted to selectively appear in a foot supporting position.

7. The baby carriage of claim 6, wherein said footrest means comprise an upper plate and a lower plate which are superposed on each other, means for turnably connecting said upper plate at its front end to said lower plate, said upper plate having an upper surface forming said first foot support surface, and said lower plate having a further upper surface forming said second foot support surface.

8. The baby carriage of claim 6, wherein said footrest means comprise an upper plate and a lower plate which are superposed on each other, and a connecting member for connecting said upper and lower plates to each other, said connecting member being turnably connected at one end thereof to a side of said lower plate and at the other end thereo to a lateral middle portion of said upper plate, said upper plate having an upper surface forming said first foot support surface, and said upper plate having a lower surface forming said second foot support surface.

9. The baby carriage of claim 6, wherein said footrest means comprise an upper plate and a lower plate which are superposed on each other, and means slidably interconnecting said upper and lower plates, whereby said upper plate is slidable on said lower plate, and wherein said upper plate has an upper surface forming said first foot support surface, and said lower plate having a further upper surface forming said second foot support surface.

* * * * *

UNITED STATES PATENT AND TRADEMARK OFFICE
CERTIFICATE OF CORRECTION

PATENT NO. : 4,714,292
DATED : December 22, 1987
INVENTOR(S) : Kenzou Kassai

It is certified that error appears in the above-identified patent and that said Letters Patent is hereby corrected as shown below:

On the Title Page

In [30] the Foreign Application Priority Data should read as follows:

-- Jul. 4, 1984 [JP]   Japan .................. 59-101863[U]
   Sep. 10, 1984 [JP]  Japan .................. 59-137744[U]
   Mar. 18, 1985 [JP]  Japan .................. 60-54805 [P]--.

In [57] line 3 of the Abstract, "whose level can be adjusted" should be deleted.

In Claim 1, (column 12, line 24), replace "in" by --is--.

Signed and Sealed this

Fourteenth Day of June, 1988

Attest:

DONALD J. QUIGG

Attesting Officer        Commissioner of Patents and Trademarks